(12) United States Patent
Kappagantu et al.

(10) Patent No.: US 12,197,384 B2
(45) Date of Patent: Jan. 14, 2025

(54) METHOD AND SYSTEM FOR INTERACTION ARTIFACT MANAGEMENT

(71) Applicant: JPMorgan Chase Bank, N.A., New York, NY (US)

(72) Inventors: Ravi Kappagantu, Hyderabad (IN); Sambasiva Tatikonda, Guntur (IN); Sanjay Puram, New Albany, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 300 days.

(21) Appl. No.: 17/644,181

(22) Filed: Dec. 14, 2021

(65) Prior Publication Data

US 2023/0138827 A1    May 4, 2023

(30) Foreign Application Priority Data

Oct. 30, 2021    (IN) .............................. 202111049832

(51) Int. Cl.
| | | |
|---|---|---|
| *G06F 16/16* | (2019.01) | |
| *G06F 16/11* | (2019.01) | |
| *G06F 16/14* | (2019.01) | |
| *G06F 40/205* | (2020.01) | |

(52) U.S. Cl.
CPC .......... *G06F 16/125* (2019.01); *G06F 16/156* (2019.01); *G06F 16/164* (2019.01); *G06F 40/205* (2020.01)

(58) Field of Classification Search
CPC ..... G06F 16/125; G06F 16/164; G06F 16/156
See application file for complete search history.

(56) References Cited

U.S. PATENT DOCUMENTS

| | | | | |
|---|---|---|---|---|
| 10,180,955 | B1* | 1/2019 | Kayyoor | G06F 16/334 |
| 10,623,520 | B1* | 4/2020 | Anderson, III | G06F 16/2443 |
| 11,699,113 | B1* | 7/2023 | Pearson | G06V 20/41 |
| | | | | 707/609 |
| 2007/0162359 | A1* | 7/2007 | Gokhale | G06Q 10/08 |
| | | | | 705/28 |
| 2013/0090973 | A1* | 4/2013 | Hui | G06Q 10/109 |
| | | | | 705/1.1 |
| 2014/0074832 | A1* | 3/2014 | Chitiveli | G06F 3/0649 |
| | | | | 707/736 |
| 2015/0339370 | A1* | 11/2015 | Onusko | G06F 16/284 |
| | | | | 707/722 |

(Continued)

*Primary Examiner* — Hosain T Alam
*Assistant Examiner* — Robert F May
(74) *Attorney, Agent, or Firm* — GREENBLUM & BERNSTEIN P.L.C.

(57) ABSTRACT

A method for managing interaction artifacts by using associated metadata is provided. The method includes retrieving, in real-time, a data set from a data channel, the data set relating to an interaction; parsing, by using a model, the data set to identify a data element, the data element relating to a context of the interaction; identifying an artifact that corresponds to the data set by using the data element; determining a retention characteristic for the data set and the corresponding artifact based on the data element and a predetermined guideline; generating metadata for the data set based on at least one from among the data element, the retention characteristic, and the corresponding artifact; and persisting the generated metadata in a centralized metadata repository.

20 Claims, 10 Drawing Sheets

(56) References Cited

U.S. PATENT DOCUMENTS

| | | | |
|---|---|---|---|
| 2015/0379026 A1* | 12/2015 | Todd | G06F 16/125 |
| | | | 707/694 |
| 2015/0379429 A1* | 12/2015 | Lee | G09B 5/00 |
| | | | 706/11 |
| 2018/0276223 A1* | 9/2018 | Dhanasekaran | G06F 16/125 |
| 2021/0173621 A1* | 6/2021 | Fender | G06F 8/71 |

* cited by examiner (CONT. 2)

METHOD AND SYSTEM FOR INTERACTION ARTIFACT MANAGEMENT

CROSS-REFERENCE TO RELATED APPLICATIONS

This application claims the benefit of Indian Provisional Patent Application No. 202111049832, filed Oct. 30, 2021, which is hereby incorporated by reference in its entirety.

BACKGROUND

1. Field of the Disclosure

This technology generally relates to methods and systems for managing artifacts, and more particularly to methods and systems for managing artifacts derived from customer interactions by using associated metadata.

2. Background Information

Many business entities provide services to customers by engaging in various interactions with the customers. Records of the interactions are usually retained for a predetermined amount of time to satisfy legal and business requirements. Often, the records may include numerous artifacts such as, for example, call recordings, screen recordings, and transcripts that have been derived from the interactions. Historically, conventional techniques for managing the artifacts have resulted in varying degrees of success with respect to management of interactions and corresponding artifacts across different media types.

One drawback of using conventional techniques for managing the artifacts is that in many instances, artifacts derived from the interactions may comprise many different media types, which are processed by various different data services across numerous different data channels. As a result, artifact management actions such as, for example, hold actions and release actions must be accomplished separately for each of the different media types. Additionally, inconsistencies in the holding and the releasing of all derivative artifacts for a particular interaction may occur due to the separate implementation of the artifact management actions.

Therefore, there is a need for an artifact management technique that leverages a centralized metadata repository together with data pointers to manage hold and release actions for all derivatives of an interaction across different media types.

SUMMARY

The present disclosure, through one or more of its various aspects, embodiments, and/or specific features or sub-components, provides, inter alia, various systems, servers, devices, methods, media, programs, and platforms for managing artifacts derived from customer interactions by using associated metadata.

According to an aspect of the present disclosure, a method for managing interaction artifacts by using associated metadata is disclosed. The method is implemented by at least one processor. The method may include retrieving, in real-time, at least one data set from a data channel, the at least one data set may relate to an interaction; parsing, by using at least one model, the at least one data set to identify at least one data element, the at least one data element may relate to a context of the interaction; identifying at least one artifact that corresponds to the at least one data set by using the at least one data element; determining a retention characteristic for the at least one data set and the corresponding at least one artifact based on the at least one data element and a predetermined guideline; generating metadata for the at least one data set based on at least one from among the at least one data element, the retention characteristic, and the corresponding at least one artifact; and persisting the generated metadata in a centralized metadata repository.

In accordance with an exemplary embodiment, the at least one artifact may include data that relates to at least one from among call recording data, transcript data, email data, chat log data, social media data, and screen capture data, the transcript data may relate to a textual representation of the data.

In accordance with an exemplary embodiment, the retention characteristic may include a time characteristic, the time characteristic may relate to a period of time to persist the at least one data set and the corresponding at least one artifact.

In accordance with an exemplary embodiment, the retention characteristic may include a frequency of access characteristic, the frequency of access characteristic may relate to a data access rate for the at least one data set and the corresponding at least one artifact.

In accordance with an exemplary embodiment, the predetermined guideline may include a cost threshold, the cost threshold may relate to a data persistence cost of the at least one data set and the at least one artifact.

In accordance with an exemplary embodiment, the metadata may include information that relates to at least one from among an association between the at least one data set and the at least one artifact, and a pointer that corresponds to the at least one artifact, the pointer may relate to a data object that stores a memory address of the at least one artifact.

In accordance with an exemplary embodiment, the method may further include indexing the metadata; receiving, via a graphical user interface, at least one search request that relates to the at least one data set, the at least one search request may include at least one search parameter; identifying information in the metadata that corresponds to the at least one search parameter; and retrieving, by using the identified information, artifact data from the at least one artifact.

In accordance with an exemplary embodiment, the method may further include generating at least one graphical element, the at least one graphical element may include the retrieved artifact data and the identified information; and displaying, via the graphical user interface, the at least one graphical element in response to the at least one search request.

In accordance with an exemplary embodiment, the at least one search parameter may include at least one from among a date parameter, a timestamp parameter, a calling number parameter, an agent identifier parameter, a universal identifier parameter, an interaction parameter, and an account number parameter.

In accordance with an exemplary embodiment, the method may further include receiving, via a graphical user interface, at least one hold request, the at least one hold request may relate to a temporary retention of the at least one data set; and updating the metadata that corresponds to the at least one data set based on the at least one hold request to prevent release of the at least one data set and the at least one artifact.

According to an aspect of the present disclosure, a computing device configured to implement an execution of a method for managing interaction artifacts by using associated metadata is disclosed. The computing device comprising a processor; a memory; and a communication interface coupled to each of the processor and the memory, wherein the processor may be configured to retrieve, in real-time, at least one data set from a data channel, the at least one data set may relate to an interaction; parse, by using at least one model, the at least one data set to identify at least one data element, the at least one data element may relate to a context of the interaction; identify at least one artifact that corresponds to the at least one data set by using the at least one data element; determine a retention characteristic for the at least one data set and the corresponding at least one artifact based on the at least one data element and a predetermined guideline; generate metadata for the at least one data set based on at least one from among the at least one data element, the retention characteristic, and the corresponding at least one artifact; and persist the generated metadata in a centralized metadata repository.

In accordance with an exemplary embodiment, the at least one artifact may include data that relates to at least one from among call recording data, transcript data, email data, chat log data, social media data, and screen capture data, the transcript data may relate to a textual representation of the data.

In accordance with an exemplary embodiment, the retention characteristic may include a time characteristic, the time characteristic may relate to a period of time to persist the at least one data set and the corresponding at least one artifact.

In accordance with an exemplary embodiment, the retention characteristic may include a frequency of access characteristic, the frequency of access characteristic may relate to a data access rate for the at least one data set and the corresponding at least one artifact.

In accordance with an exemplary embodiment, the predetermined guideline may include a cost threshold, the cost threshold may relate to a data persistence cost of the at least one data set and the at least one artifact.

In accordance with an exemplary embodiment, the metadata may include information that relates to at least one from among an association between the at least one data set and the at least one artifact, and a pointer that corresponds to the at least one artifact, the pointer may relate to a data object that stores a memory address of the at least one artifact.

In accordance with an exemplary embodiment, the processor may be further configured to index the metadata; receive, via a graphical user interface, at least one search request that relates to the at least one data set, the at least one search request may include at least one search parameter; identify information in the metadata that corresponds to the at least one search parameter; and retrieve, by using the identified information, artifact data from the at least one artifact.

In accordance with an exemplary embodiment, the processor may be further configured to generate at least one graphical element, the at least one graphical element may include the retrieved artifact data and the identified information; and display, via the graphical user interface, the at least one graphical element in response to the at least one search request.

In accordance with an exemplary embodiment, the at least one search parameter may include at least one from among a date parameter, a timestamp parameter, a calling number parameter, an agent identifier parameter, a universal identifier parameter, an interaction parameter, and an account number parameter.

In accordance with an exemplary embodiment, the processor may be further configured to receive, via a graphical user interface, at least one hold request, the at least one hold request may relate to a temporary retention of the at least one data set; and update the metadata that corresponds to the at least one data set based on the at least one hold request to prevent release of the at least one data set and the at least one artifact.

According to an aspect of the present disclosure, a non-transitory computer readable storage medium storing instructions for managing interaction artifacts by using associated metadata is disclosed. The storage medium including executable code which, when executed by a processor, may cause the processor to retrieve, in real-time, at least one data set from a data channel, the at least one data set may relate to an interaction; parse, by using at least one model, the at least one data set to identify at least one data element, the at least one data element may relate to a context of the interaction; identify at least one artifact that corresponds to the at least one data set by using the at least one data element; determine a retention characteristic for the at least one data set and the corresponding at least one artifact based on the at least one data element and a predetermined guideline; generate metadata for the at least one data set based on at least one from among the at least one data element, the retention characteristic, and the corresponding at least one artifact; and persist the generated metadata in a centralized metadata repository.

In accordance with an exemplary embodiment, the at least one artifact may include data that relates to at least one from among call recording data, transcript data, email data, chat log data, social media data, and screen capture data, the transcript data may relate to a textual representation of the data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
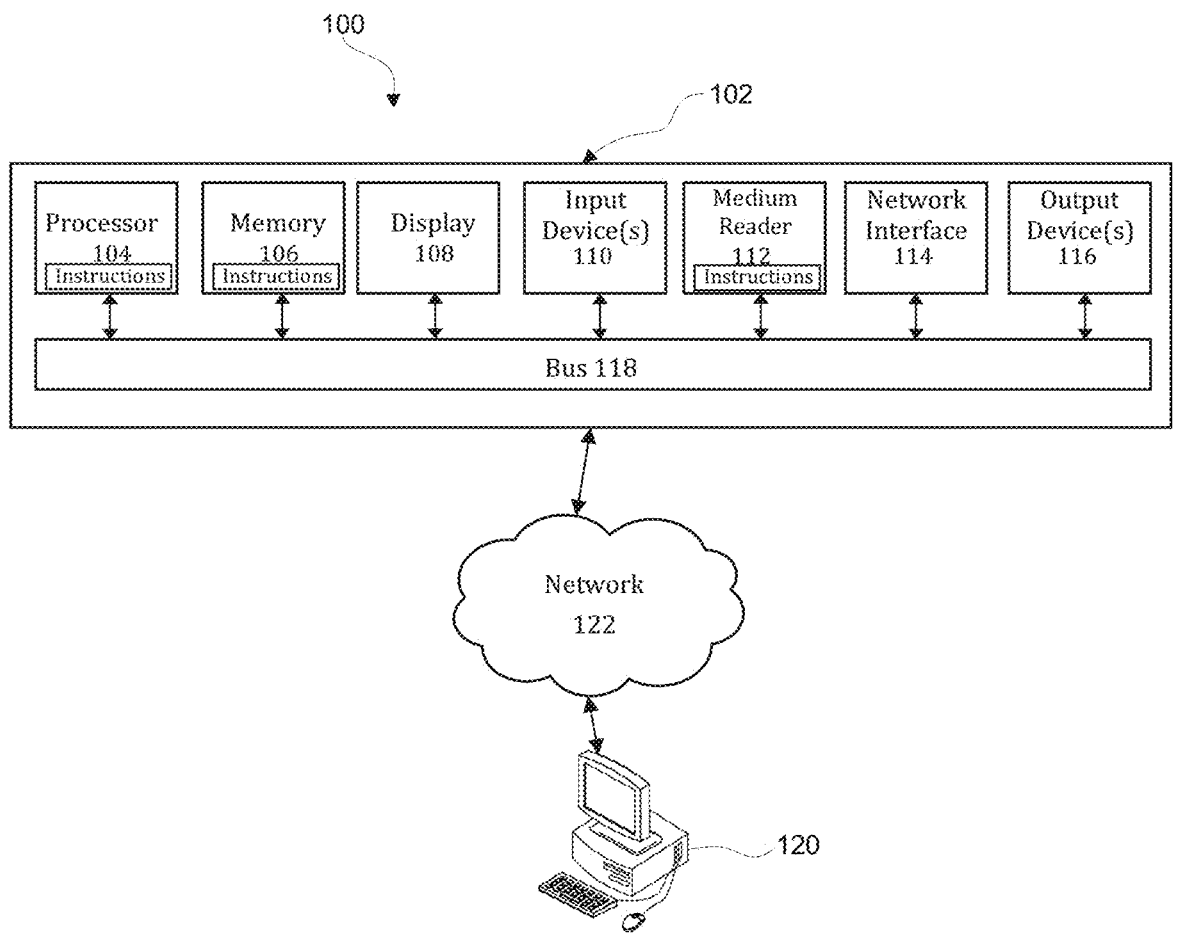
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for managing artifacts derived from customer interactions by using associated metadata.

Figure 2:
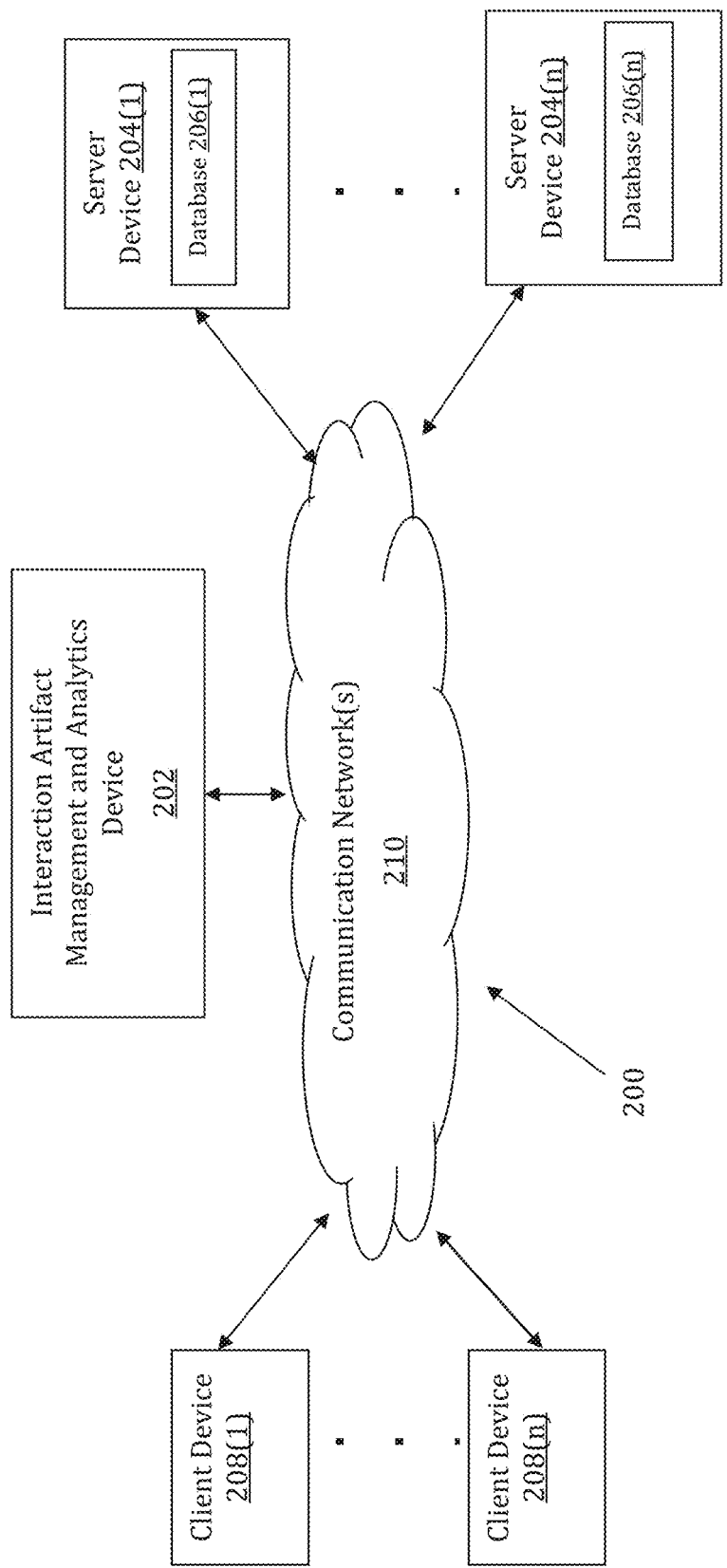
FIG. 2 illustrates an exemplary diagram of a network environment.

Referring to FIG. 2, a schematic of an exemplary network environment 200 for implementing a method for managing artifacts derived from customer interactions by using associated metadata is illustrated. In an exemplary embodiment, the method is executable on any networked computer platform, such as, for example, a personal computer (PC).

The method for managing artifacts derived from customer interactions by using associated metadata may be implemented by an Interaction Artifact Management and Analytics (IAMA) device 202. The IAMA device 202 may be the same or similar to the computer system 102 as described with respect to FIG. 1. The IAMA device 202 may store one or more applications that can include executable instructions that, when executed by the IAMA device 202, cause the IAMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IAMA device 202 itself, may be located in virtual server(s) running in a cloud-based computing environment rather than being tied to one or more specific physical network computing devices. Also, the application(s) may be running in one or more virtual machines (VMs) executing on the IAMA device 202. Additionally, in one or more embodiments of this technology, virtual machine(s) running on the IAMA device 202 may be managed or supervised by a hypervisor.

In the network environment 200 of FIG. 2, the IAMA device 202 is coupled to a plurality of server devices 204(1)-204(n) that hosts a plurality of databases 206(1)-206(n), and also to a plurality of client devices 208(1)-208(n) via communication network(s) 210. A communication interface of the IAMA device 202, such as the network interface 114 of the computer system 102 of FIG. 1, operatively couples and communicates between the IAMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IAMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and IAMA devices that efficiently implement a method for managing artifacts derived from customer interactions by using associated metadata.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IAMA device 202 may be a standalone device or integrated with one or more other devices or apparatuses, such as one or more of the server devices 204(1)-204(n), for example. In one particular example, the IAMA device 202 may include or be hosted by one of the server devices 204(1)-204(n), and other arrangements are also possible. Moreover, one or more of the devices of the IAMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IAMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to data sets, data models, data elements, artifacts, retention characteristics, predetermined guideline, metadata, search requests, search parameters, and hold requests.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the IAMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the IAMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the IAMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IAMA device 202, the server devices 204(1)-204(n), or the client devices 208(1)-208(n), for example, may be configured to operate as virtual instances on the same physical machine. In other words, one or more of the IAMA device 202, the server devices 204(1)-204(n), or the client devices 208(1)-208(n) may operate on the same physical device rather than as separate devices communicating through communication network(s) 210. Additionally, there may be more or fewer IAMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
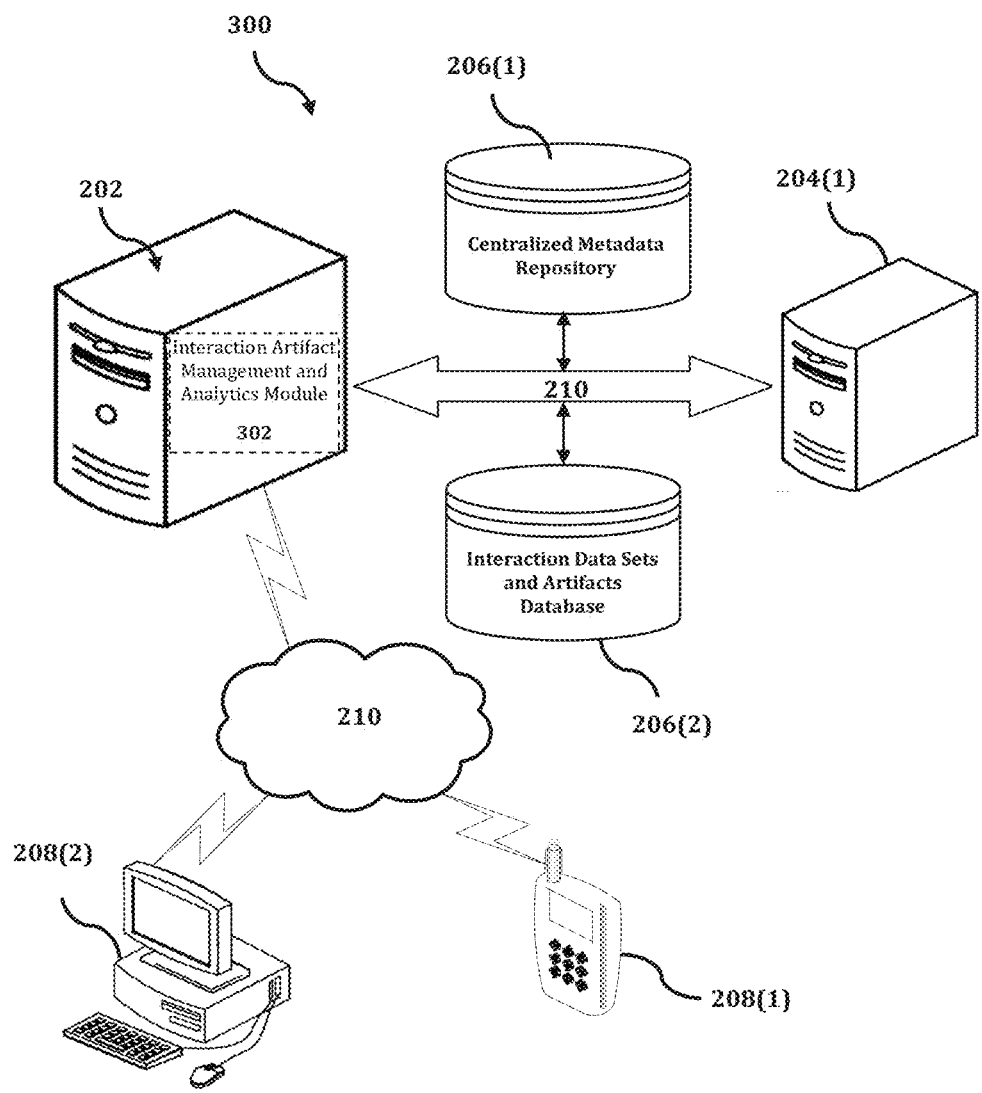
FIG. 3 shows an exemplary system for implementing a method for managing artifacts derived from customer interactions by using associated metadata.

The IAMA device 202 is described and shown in FIG. 3 as including an interaction artifact management and analytics module 302, although it may include other rules, policies, modules, databases, or applications, for example. As will be described below, the interaction artifact management and analytics module 302 is configured to implement a method for managing artifacts derived from customer interactions by using associated metadata.

An exemplary process 300 for implementing a mechanism for managing artifacts derived from customer interactions by using associated metadata by utilizing the network environment of FIG. 2 is shown as being executed in FIG. 3. Specifically, a first client device 208(1) and a second client device 208(2) are illustrated as being in communication with IAMA device 202. In this regard, the first client device 208(1) and the second client device 208(2) may be "clients" of the IAMA device 202 and are described herein as such. Nevertheless, it is to be known and understood that the first client device 208(1) and/or the second client device 208(2) need not necessarily be "clients" of the IAMA device 202, or any entity described in association therewith herein. Any additional or alternative relationship may exist between either or both of the first client device 208(1) and the second client device 208(2) and the IAMA device 202, or no relationship may exist.

Further, IAMA device 202 is illustrated as being able to access a centralized metadata repository 206(1) and an interaction data sets and artifacts database 206(2). The interaction artifact management and analytics module 302 may be configured to access these databases for implementing a method for managing artifacts derived from customer interactions by using associated metadata.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the IAMA device 202 via broadband or cellular communication. Of course, these embodiments are merely exemplary and are not limiting or exhaustive.

Upon being started, the interaction artifact management and analytics module 302 executes a process for managing artifacts derived from customer interactions by using associated metadata. An exemplary process for managing artifacts derived from customer interactions by using associated metadata is generally indicated at flowchart 400 in FIG. 4.

Figure 4:
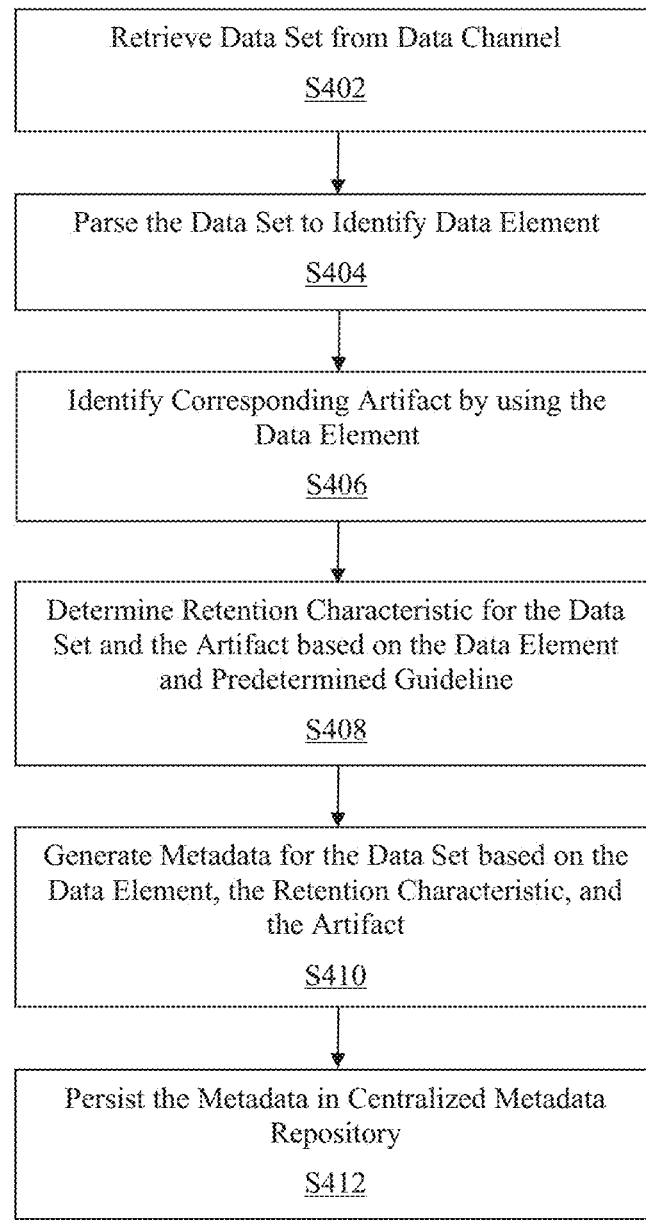
FIG. 4 is a flowchart of an exemplary process for implementing a method for managing artifacts derived from customer interactions by using associated metadata.

In the process 400 of FIG. 4, at step S402, a data set may be retrieved in real-time from a data channel. The data set may relate to an interaction such as, for example, an interaction between a customer and a company representative. In an exemplary embodiment, the data set may include an indication of the interaction. For example, the data set may include information indicating that a specific interaction is currently taking place. In another exemplary embodiment, the data set may include details of the interaction.

For example, the data set may include information relating to the specific interaction such as the parties involved, the content of the interaction, and the context of the interaction.

In another exemplary embodiment, the data set may be retrieved from data producers and applications via a corresponding data channel. For example, the data set may be retrieved from a voice processing application via a data stream. In another exemplary embodiment, the data producers may include a voice processing application, an email processing application, a live chat application, a self-service application, and a social media application. The data producers may interact with other applications and data services via corresponding data channels such as, for example, a voice channel, an email channel, a live chat channel, a self-service channel, and a social media channel.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, the microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, the data set may be parsed by using a model to identify a data element. The data element may relate to a context of the interaction. In an exemplary embodiment, the data set may be parsed by using a natural language processing model to generate the data element. For example, when the data set corresponds to a current voice communication, the natural language processing model may be utilized to generate a transcript of the voice communication in real-time based on information in the data set and a corresponding data stream.

In another exemplary embodiment, the data element may correspond to a representation of the interaction that is in a human readable format. For example, when the data set relates to a voice communication, the data element may correspond to a textual representation of the voice communication such as a transcript. In another exemplary embodiment, the data element may correspond to a representation of the interaction that is in a computer readable format. For example, when the data set relates to an email communication, the data element may correspond to a syntactic representation of the email communication such as a syntax tree.

In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S406, an artifact that corresponds to the data set may be identified by using the data element. In an exemplary embodiment, the artifact may be derived from the data set and the corresponding interaction. For example, when the interaction relates to a voice communication between a customer and a company representative, the corresponding artifact may include a screen recording of the customer device and a screen recording of the computing terminal that is used by the company representative.

In another exemplary embodiment, the artifact may include data that relates to at least one from among call recording data, transcript data, email data, chat log data, social media data, and screen capture data. The transcript data may relate to a textual representation of the data. Consistent with disclosures in the present application, the artifact may be generated by the disclosed invention as well as by connected flow service applications such as, for example, legacy analytic solutions.

At step S408, a retention characteristic may be determined for the data set and the corresponding artifact based on the data element and a predetermined guideline. In an exemplary embodiment, the retention characteristic may include a time characteristic. The time characteristic may relate to a period of time to persist the data set and the corresponding artifact based on the data element. For example, the retention characteristic may relate to a legal hold requirement that voice communications and corresponding artifacts relating to a particular subject matter be persisted for a period of six-months.

In another exemplary embodiment, the retention characteristic may include a frequency of access characteristic. The frequency of access characteristic may relate to a data access rate for the data set and the corresponding artifact. In another exemplary embodiment, a frequently accessed data set and the corresponding artifact may be tagged as qualifying for hot storage. The hot storage qualification may indicate that the data set and the corresponding artifact requires the fastest and most expensive data storage options because of the high access frequency. In another exemplary embodiment, an infrequently accessed data set and corresponding artifact may be tagged as qualifying for cold storage. The cold storage qualification may indicate that the data set and the corresponding artifact do not require the fastest and most expensive data storage options because of the low access frequency.

In another exemplary embodiment, the predetermined guideline may include a cost threshold. The cost threshold may relate to a data persistence cost of the data set and the corresponding artifact. For example, the cost threshold may indicate a predetermined budget for the persistence of the data set and the corresponding artifact. In another exemplary embodiment, the cost threshold may directly influence the retention characteristic. For example, the cost threshold may directly indicate that a shorter retention time period is required for the data set and the corresponding artifact that requires expensive storage solutions. In another exemplary embodiment, the cost threshold may indirectly influence the retention characteristic. For example, the cost threshold may indirectly indicate that the data set and the corresponding artifact be stored in inexpensive data storage solutions due to budgetary constraints despite a high access frequency.

At step S410, metadata for the data set may be generated based on at least one from among the data element, the retention characteristic, and the corresponding artifact. In an exemplary embodiment, the metadata includes information that relates to at least one from among an association between the data set and the corresponding artifact, as well as a pointer that relates to the artifact. The pointer may relate to a data object that stores a memory address of the artifact. For example, the pointer may include a special kind of variable that is designed for storing memory addresses of another variable.

In another exemplary embodiment, the metadata may include information that relates to a predetermined business purpose. For example, the metadata may indicate that the data set and the corresponding artifact are kept beyond a standard retention period for business purposes such as to tune machine learning models. As will be appreciated by a person of ordinary skill in the art, the metadata may be used to associate a particular data set of an interaction with all corresponding artifacts derived from the data set to enable seamless interactions with all available derivatives resulting from the interaction.

At step S412, the generated metadata may be persisted in a centralized metadata repository. The centralized persistence of the metadata enables access to all corresponding artifacts via the metadata. For example, to access all corresponding artifacts of a data set, a service may identify information such as storage location information of the corresponding artifacts in the metadata. Then, using the information, the service may seamlessly access all the corresponding artifacts.

In another exemplary embodiment, the centralized metadata repository may correspond to a single storage location consistent with disclosures in the present application. For example, the centralized metadata repository may correspond to a single on-premise data storage server. In another exemplary embodiment, the centralized metadata repository may correspond to a distributed data storage schema consistent with disclosures in the present application. For example, the centralized metadata repository may correspond to an integrated collection of databases that is physically distributed across different locations.

In another exemplary embodiment, the metadata may be indexed to facilitate search functionalities. The search functionalities may include receiving a search request that relates to the data set via a graphical user interface. The search request may include a search parameter. In another exemplary embodiment, the search parameter may include at least one from among a date parameter, a timestamp parameter, a calling number parameter, an agent identifier parameter, a universal identifier parameter, and interaction parameter and an account number parameter.

Information in the metadata that corresponds to the search parameter may be identified to facilitate the search functionalities. Consistent with disclosures in the present application, the information may enable access to all corresponding artifacts of the data set via the metadata. Artifact data from the corresponding artifact may be retrieved by using the identified information. In another exemplary embodiment, the artifact data may relate to a subset of data from the corresponding artifact. For example, when the corresponding artifact relates to a voice recording, the artifact data may include only voice data for a particular time period. Then, a graphical element may be generated and displayed via the graphical user interface in response to the search request. The graphical element may include the retrieved artifact data and the identified information.

In another exemplary embodiment, a hold request may be received via the graphical user interface. The hold request may relate to a temporary retention of the data set. In another exemplary embodiment, the hold request may correspond to a manual request from an administrator to hold the data set. For example, an administrator may request a hold on the data set beyond a regular retention period due to ongoing litigation. Then, the metadata that corresponds to the data set may be updated based on the hold request. The metadata may be updated based on the hold request to prevent unwanted release of the data set and the corresponding artifact. Consistent with disclosures in the present application, the hold request may include a retention characteristic such as, for example, a time characteristic, a frequency of access characteristic, and a cost characteristic.

Figure 5:
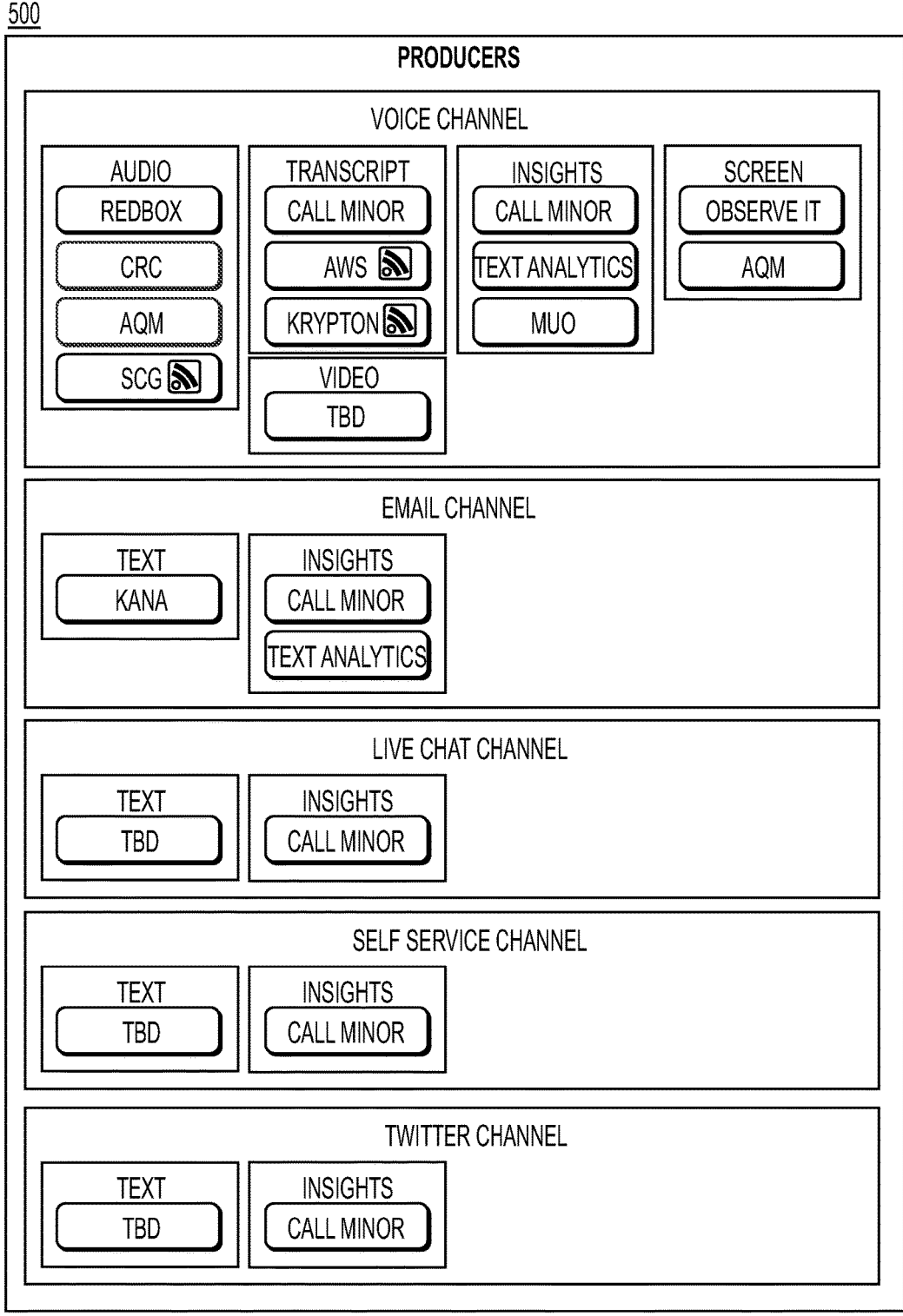
FIG. 5 is an architecture diagram of an exemplary process for implementing a method for managing artifacts derived from customer interactions by using associated metadata.
Figure 5:
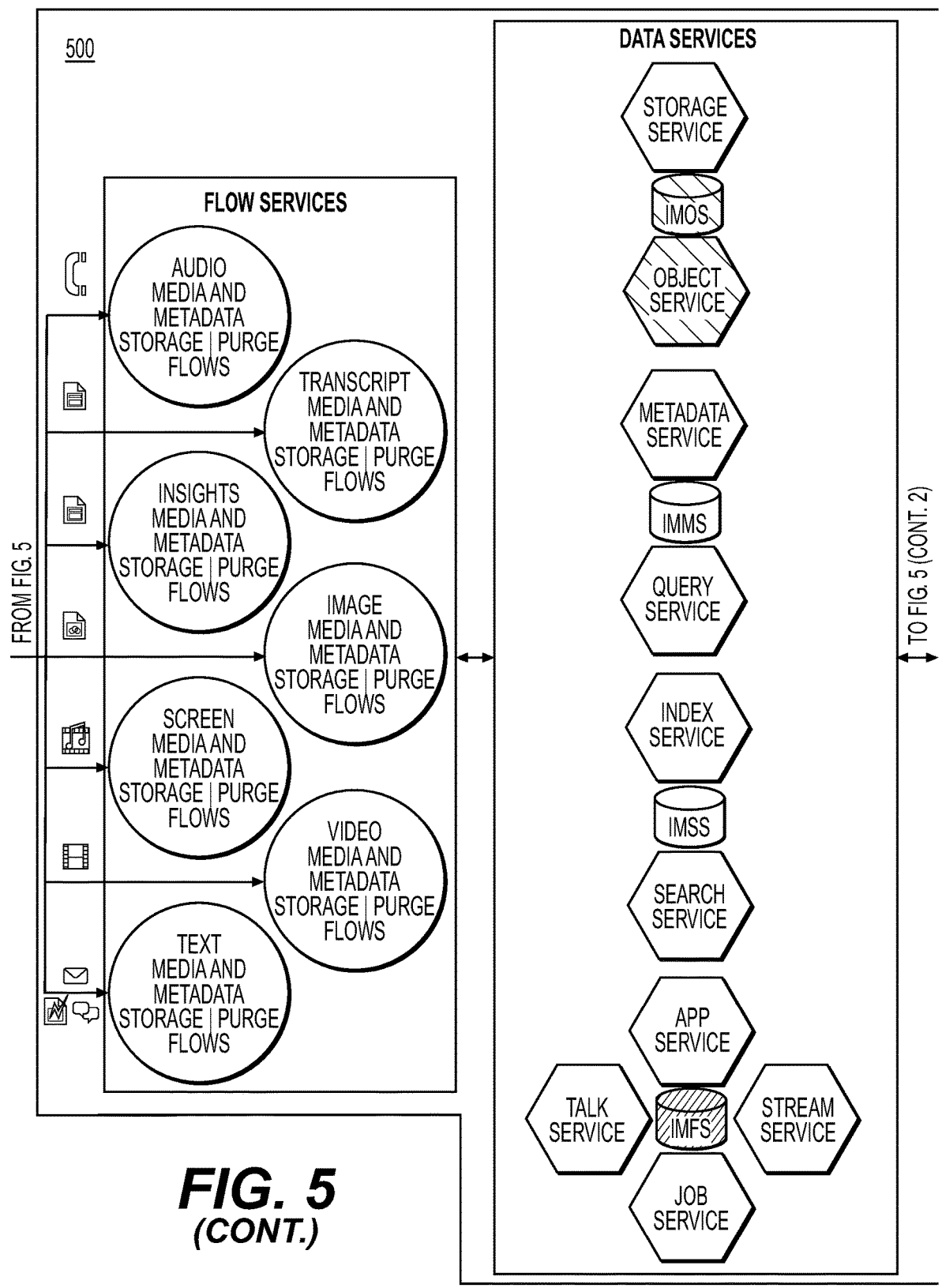
Figure 5:
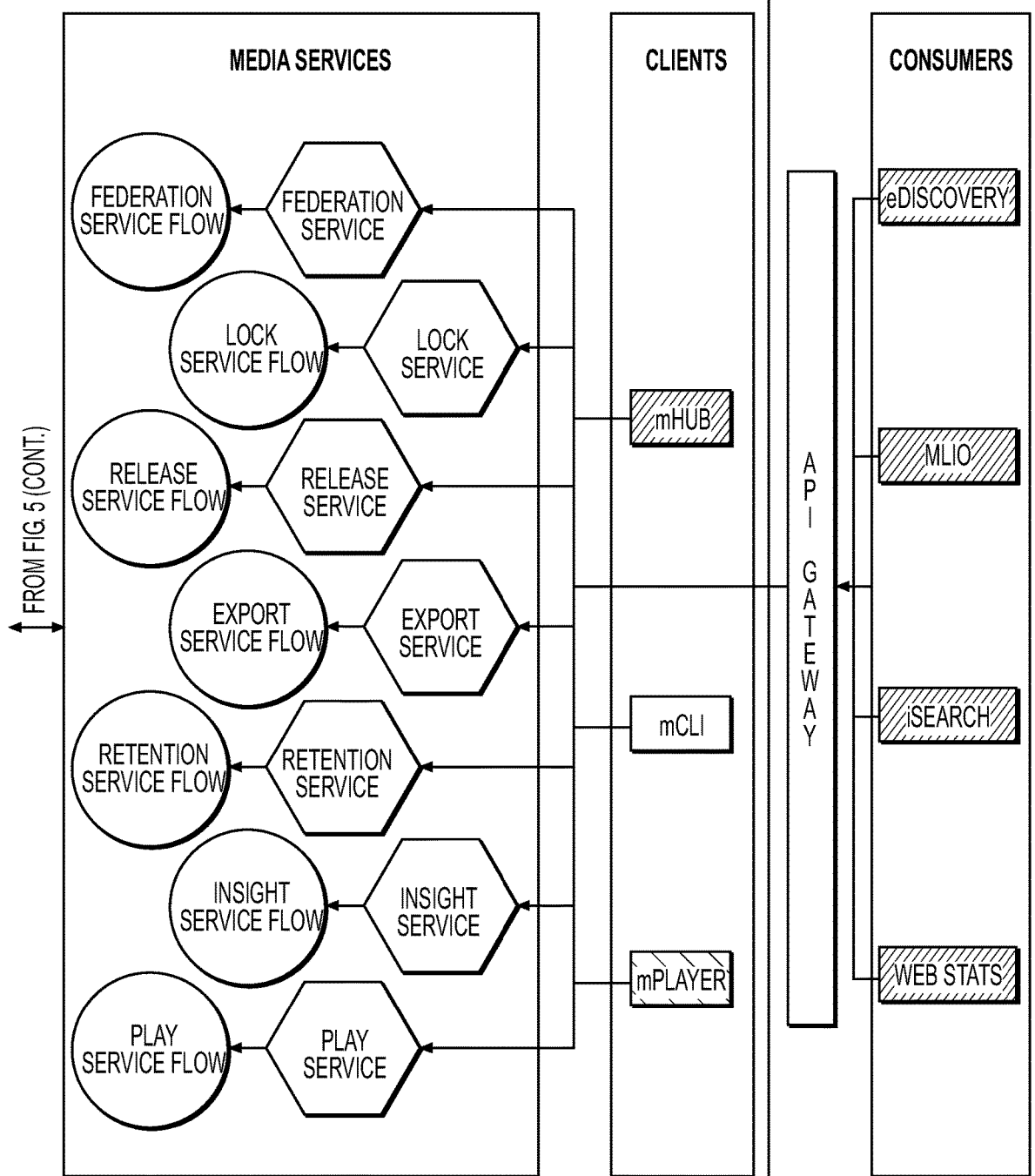

FIG. 5 is an architecture diagram 500 of an exemplary process for implementing a method for managing artifacts derived from customer interactions by using associated metadata. In FIG. 5, the disclosed invention may interact with producers via a data stream provider such as, for example, KAFKA and consumers via an application programming interface (API) gateway.

As illustrated in FIG. 5, data from producers may be retrieved via communication channels. The communication channels may include a voice channel, an email channel, a live chat channel, a self-service channel, and a social media channel. The retrieved data may be processed by corresponding flow services, which orchestrate data consumer streams and flow tasks based on the data source. The flow services may process audio data, transcript data, email data, chat data, and screen capture data. Additionally, the flow services may process the retrieved data consistent with disclosures in the present application. For example, a media processor may utilize a call miner to extract textual data from audio data for post call analytics.

In an exemplary embodiment, the flow services may interact with a user via a graphical user interface. For example, the user may interact with the graphical user interface such as a dashboard to configure the data streams and tasks. Then, the flow services may utilize data services to persist the data and associated metadata. The data services may utilize high availability storage locations to store any type of media. The data services may utilize a bucketing schema to store the media in buckets such as, for example, regional buckets. Consumers may utilize clients to access the media services via the API gateway. The media services may interact with the data services to retrieve requested data consistent with disclosures in the present application. In another exemplary embodiment, export services may be utilized to output the requested data in a requested data format. Data translations may be necessary to output the requested data in the requested data format.

Figure 6:
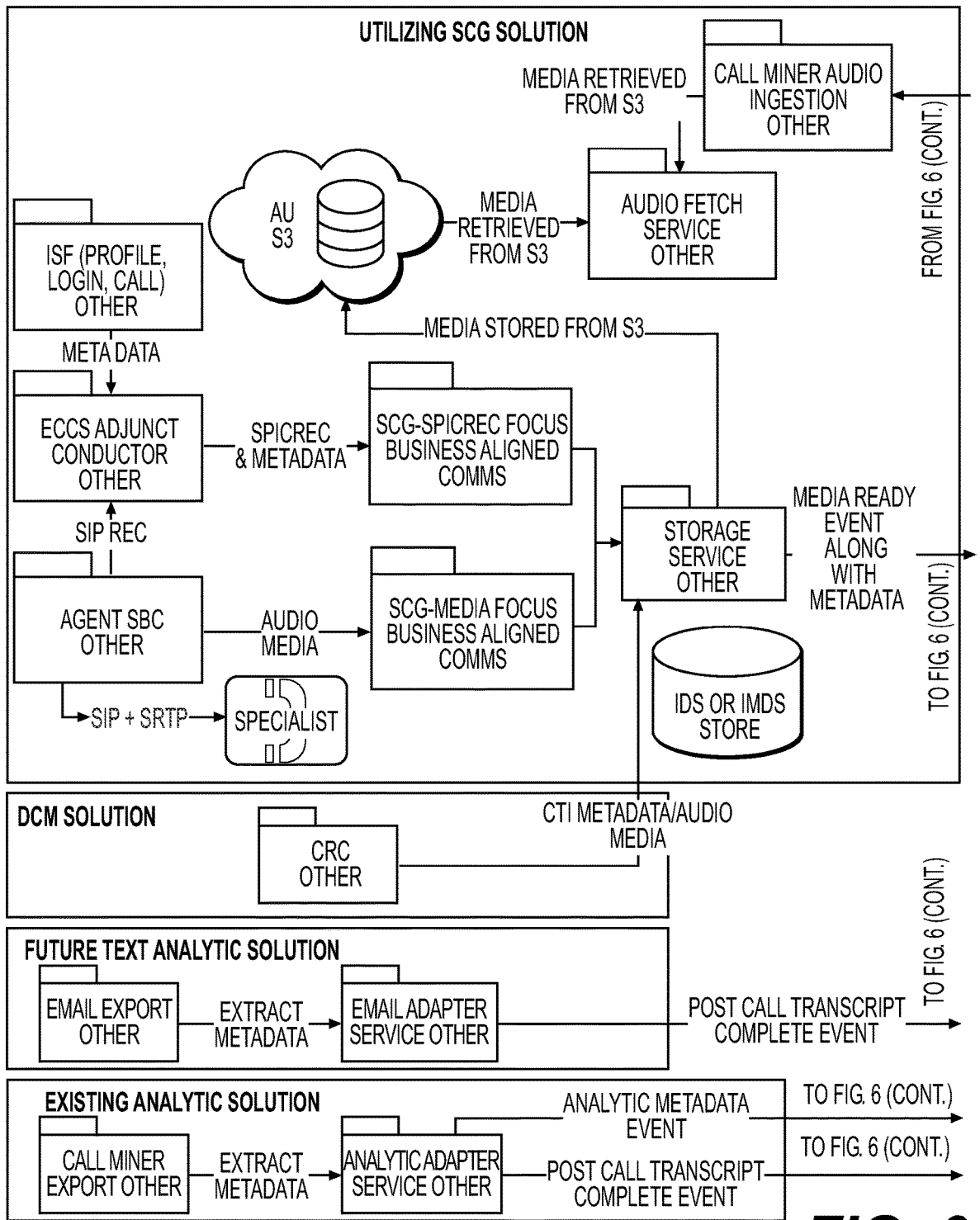
FIG. 6 is an architecture diagram of an exemplary long-term process for implementing a method for managing artifacts derived from customer interactions by using associated metadata.
Figure 6:
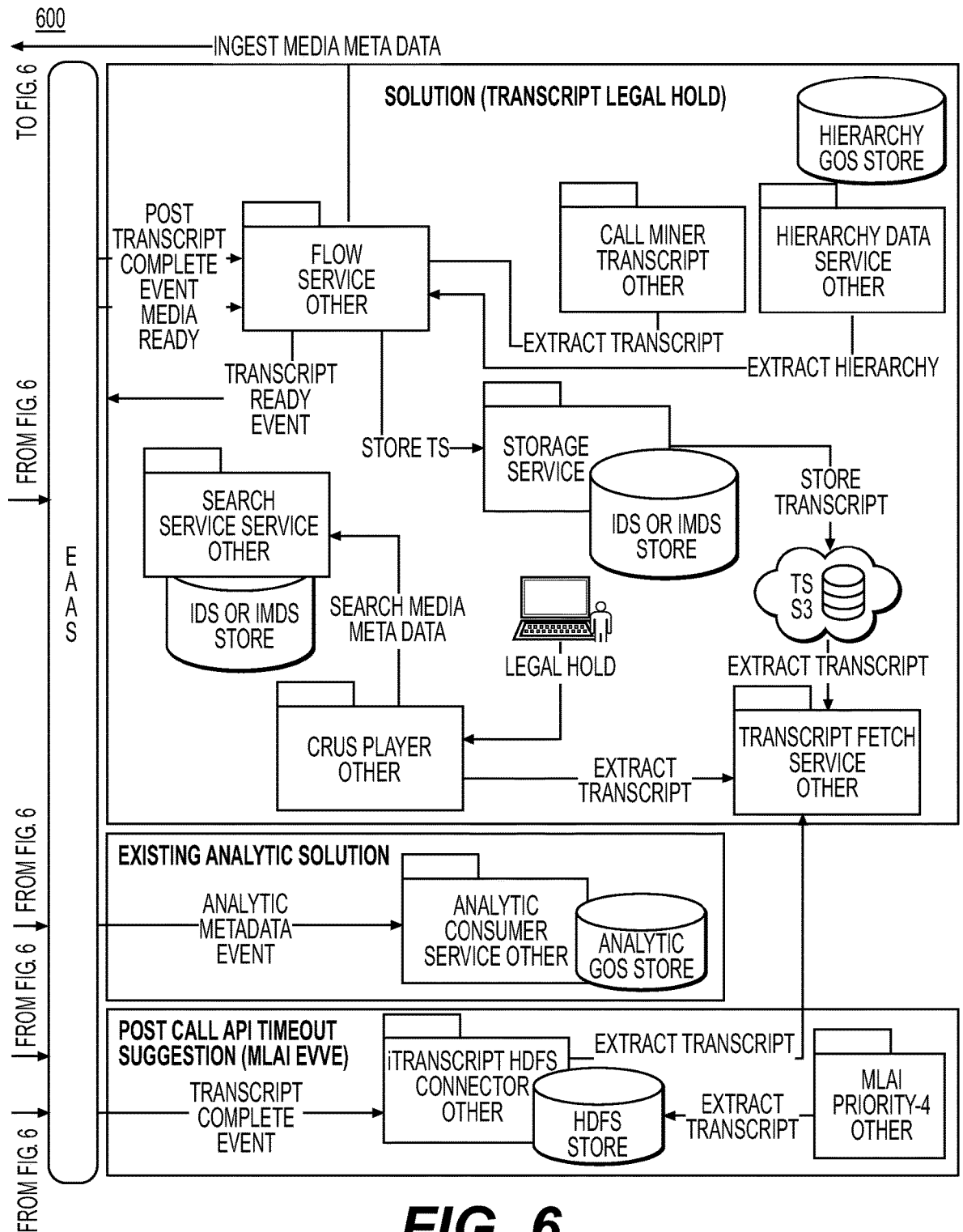

FIG. 6 is an architecture diagram 600 of an exemplary long-term process for implementing a method for managing artifacts derived from customer interactions by using associated metadata. In FIG. 6, a process for managing artifacts via a data stream is provided to facilitate integration with existing media management solutions.

As illustrated in FIG. 6, existing analytic solutions and future analytic solutions may be readily integrated with the claimed invention. By utilizing data streams, integration of various analytic components may be accomplished compartmentally. Consistent with disclosures in the present application, the claimed invention may utilize fetch services to retrieve necessary data from the analytic components. The fetch services may fetch media details such as, for example, transcript details, audio details, email details, text details, chat details, and screen capture details.

Figure 7:
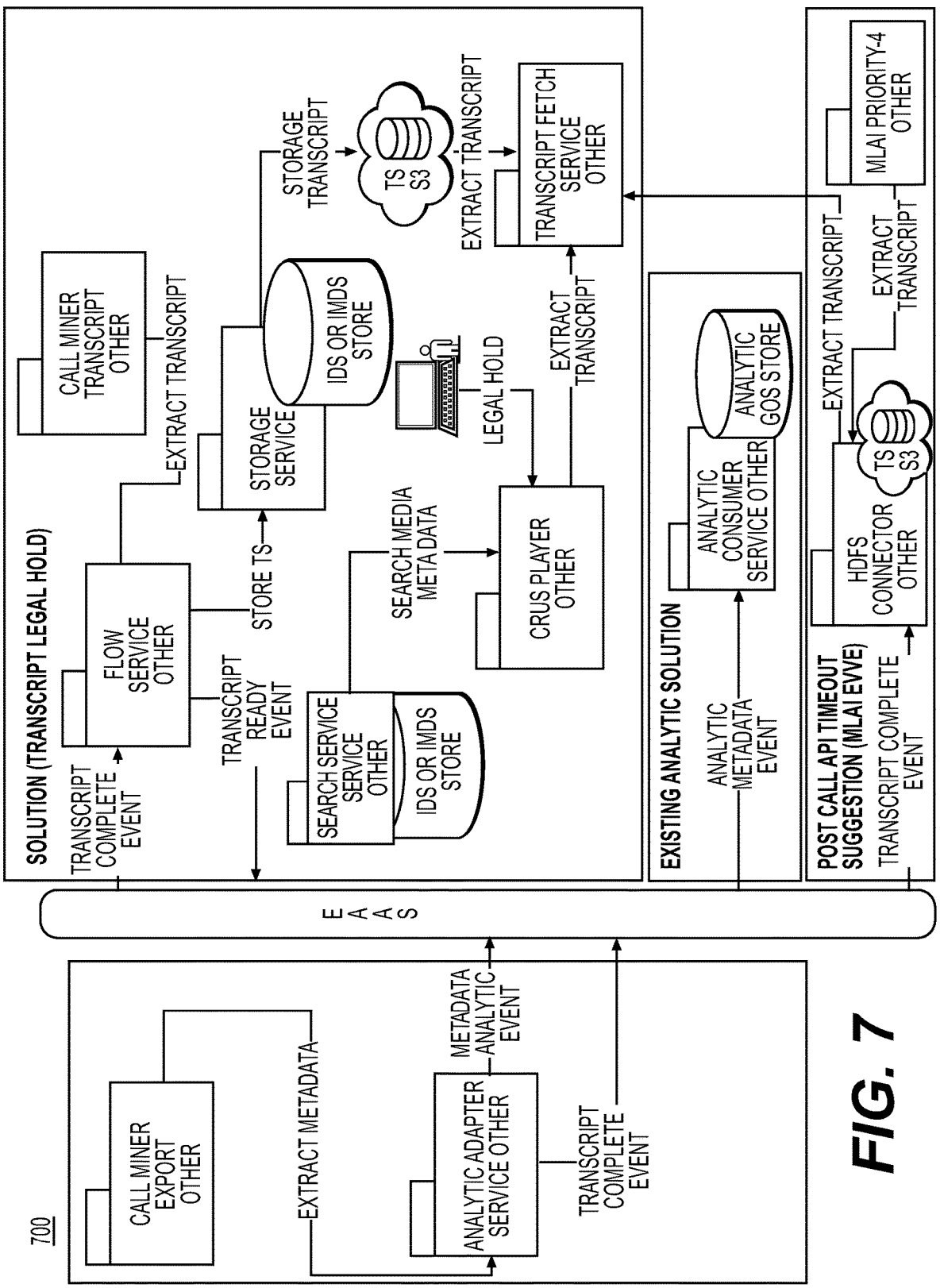
FIG. 7 is an architecture diagram of an exemplary legal hold process for implementing a method for managing artifacts derived from customer interactions by using associated metadata.

FIG. 7 is an architecture diagram 700 of an exemplary legal hold process for implementing a method for managing artifacts derived from customer interactions by using associated metadata. In FIG. 7, the exemplary legal hold process may be implemented to hold and release all derivatives of an interaction across different media types according to legal requirements.

As illustrated in FIG. 7, existing analytic solutions may extract information from audio communications and generate transcripts. Consistent with disclosures in the present application, the claimed invention may utilize flow services to process the extracted information and transcripts. The flow services may utilize data services to persist the extracted information and transcripts based on a retention policy. Consumers may interact with media services via clients to retrieve the extracted data and transcript as well as to manage the retention policy.

Accordingly, with this technology, an optimized process for managing artifacts derived from customer interactions by using associated metadata is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing interaction artifacts by using associated metadata, the method being implemented by at least one processor, the method comprising:
retrieving, by the at least one processor in real-time, at least one data set from a data channel, the at least one data set relating to an interaction;
parsing, by the at least one processor using at least one model, the at least one data set to identify at least one data element,
wherein the at least one data element relates to a context of the interaction that is automatically determined in real-time based on the at least one data set and a corresponding data stream;
wherein the at least one data element includes a syntax tree that corresponds to a syntactic representation of the at least one data set; and
wherein the at least one model includes a machine learning model;
identifying, by the at least one processor, at least one artifact that corresponds to the at least one data set by using the at least one data element;
determining, by the at least one processor, a retention characteristic for the at least one data set and the corresponding at least one artifact based on the at least one data element and a predetermined guideline;
generating, by the at least one processor, metadata for the at least one data set based on the at least one data element, the retention characteristic, and the corresponding at least one artifact,
wherein the metadata includes a data object that stores a memory address for each of the at least one artifact; and
persisting, by the at least one processor, the generated metadata in a centralized metadata repository,
wherein the centralized metadata repository corresponds to an integrated collection of databases in a distributed data storage schema.

2. The method of claim 1, wherein the at least one artifact includes data that relates to at least one from among call recording data, transcript data, email data, chat log data, social media data, and screen capture data, the transcript data relating to a textual representation of the data.

3. The method of claim 1, wherein the retention characteristic includes a time characteristic, the time characteristic relating to a period of time to persist the at least one data set and the corresponding at least one artifact.

4. The method of claim 1, wherein the retention characteristic includes a frequency of access characteristic, the frequency of access characteristic relating to a data access rate for the at least one data set and the corresponding at least one artifact.

5. The method of claim 1, wherein the predetermined guideline includes a cost threshold, the cost threshold relating to a data persistence cost of the at least one data set and the at least one artifact.

6. The method of claim 1, wherein the metadata includes information that relates to at least one from among an association between the at least one data set and the at least one artifact, and a pointer that corresponds to the at least one artifact, the pointer relating to the data object that stores the memory address of the at least one artifact.

7. The method of claim 1, further comprising:
indexing, by the at least one processor, the metadata;
receiving, by the at least one processor via a graphical user interface, at least one search request that relates to the at least one data set, the at least one search request including at least one search parameter;
identifying, by the at least one processor, information in the metadata that corresponds to the at least one search parameter; and
retrieving, by the at least one processor using the identified information, artifact data from the at least one artifact.

8. The method of claim 7, further comprising:
generating, by the at least one processor, at least one graphical element, the at least one graphical element including the retrieved artifact data and the identified information; and displaying, by the at least one processor via the graphical user interface, the at least one graphical element in response to the at least one search request.

9. The method of claim 7, wherein the at least one search parameter includes at least one from among a date parameter, a timestamp parameter, a calling number parameter, an agent identifier parameter, a universal identifier parameter, an interaction parameter, and an account number parameter.

10. The method of claim 1, further comprising:
receiving, by the at least one processor via a graphical user interface, at least one hold request, the at least one hold request relating to a temporary retention of the at least one data set; and
updating, by the at least one processor, the metadata that corresponds to the at least one data set based on the at least one hold request to prevent release of the at least one data set and the at least one artifact.

11. A computing device configured to implement an execution of a method for managing interaction artifacts by using associated metadata, the computing device comprising:
a processor;
a memory; and
a communication interface coupled to each of the processor and the memory,
wherein the processor is configured to:
retrieve, in real-time, at least one data set from a data channel, the at least one data set relating to an interaction;
parse, by using at least one model, the at least one data set to identify at least one data element,
wherein the at least one data element relates to a context of the interaction that is automatically determined in real-time based on the at least one data set and a corresponding data stream;
wherein the at least one data element includes a syntax tree that corresponds to a syntactic representation of the at least one data set; and
wherein the at least one model includes a machine learning model;
identify at least one artifact that corresponds to the at least one data set by using the at least one data element;
determine a retention characteristic for the at least one data set and the corresponding at least one artifact based on the at least one data element and a predetermined guideline;
generate metadata for the at least one data set based on the at least one data element, the retention characteristic, and the corresponding at least one artifact,
wherein the metadata includes a data object that stores a memory address for each of the at least one artifact; and
persist the generated in a centralized metadata repository,
wherein the centralized metadata repository corresponds to an integrated collection of databases in a distributed data storage schema.

12. The computing device of claim 11, wherein the at least one artifact includes data that relates to at least one from among call recording data, transcript data, email data, chat log data, social media data, and screen capture data, the transcript data relating to a textual representation of the data.

13. The computing device of claim 11, wherein the retention characteristic includes a time characteristic, the time characteristic relating to a period of time to persist the at least one data set and the corresponding at least one artifact.

14. The computing device of claim 11, wherein the retention characteristic includes a frequency of access characteristic, the frequency of access characteristic relating to a data access rate for the at least one data set and the corresponding at least one artifact.

15. The computing device of claim 11, wherein the predetermined guideline includes a cost threshold, the cost threshold relating to a data persistence cost of the at least one data set and the at least one artifact.

16. The computing device of claim 11, wherein the metadata includes information that relates to at least one from among an association between the at least one data set and the at least one artifact, and a pointer that corresponds to the at least one artifact, the pointer relating to the data object that stores the memory address of the at least one artifact.

17. The computing device of claim 11, wherein the processor is further configured to:
    index the metadata;
    receive, via a graphical user interface, at least one search request that relates to the at least one data set, the at least one search request including at least one search parameter;
    identify information in the metadata that corresponds to the at least one search parameter; and
    retrieve, by using the identified information, artifact data from the at least one artifact.

18. The computing device of claim 17, wherein the processor is further configured to:
    generate at least one graphical element, the at least one graphical element including the retrieved artifact data and the identified information; and
    display, via the graphical user interface, the at least one graphical element in response to the at least one search request.

19. The computing device of claim 17, wherein the at least one search parameter includes at least one from among a date parameter, a timestamp parameter, a calling number parameter, an agent identifier parameter, a universal identifier parameter, an interaction parameter, and an account number parameter.

20. The computing device of claim 11, wherein the processor is further configured to:
    receive, via a graphical user interface, at least one hold request, the at least one hold request relating to a temporary retention of the at least one data set; and
    update the metadata that corresponds to the at least one data set based on the at least one hold request to prevent release of the at least one data set and the at least one artifact.

* * * * *